United States Patent [19]

Pegov et al.

[11] 4,359,916
[45] Nov. 23, 1982

[54] METHOD OF MACHINING PARTS SHAPED AS BODIES OF REVOLUTION

[76] Inventors: Vadim B. Pegov, ulitsa Bodraya Novaya, 13, kv. 35; Grigory B. Deich, ulitsa Mescheryakova, 14, kv. 16; Solomon Y. Dvorkin, bulvar Yana Rainisa, 18, korpus 2, kv. 62; Konstantin V. Ukholov, I Tushinsky proezd, 3, kv. 123,, all of Moscow, U.S.S.R.

[21] Appl. No.: 172,011

[22] Filed: Jul. 24, 1980

[51] Int. Cl.³ .......................... B23B 1/00; B23B 7/00
[52] U.S. Cl. ........................................ 82/1 C; 82/2 B
[58] Field of Search ............................ 82/1 C, 2 B, 25

[56] References Cited

U.S. PATENT DOCUMENTS

| 2,701,496 | 2/1955 | Wilson | 82/25 |
| 3,754,487 | 8/1973 | Nachtigal | 82/2 B |
| 3,967,515 | 7/1976 | Nachtigal et al. | 82/2 B |

FOREIGN PATENT DOCUMENTS

| 588061 | 1/1978 | U.S.S.R. | 82/1 C |
| 588065 | 1/1978 | U.S.S.R. | 82/1 C |

*Primary Examiner*—Leonidas Vlachos
*Attorney, Agent, or Firm*—Robert E. Burns; Emmanuel J. Lobato; Bruce L. Adams

[57] ABSTRACT

A method of machining parts shaped as bodies of revolutionists consists in that cutters are arranged along a circumference, the axis of which coincides with that of a workpiece being machined, a forming cutter being set so that its point is spaced apart from the axis of the workpiece at a distance equal to the radius of a finished part, whereas non-forming cutters are set with their points spaced at distances from the axis of the workpiece being machined within stock left for machining, all the cutters being given longitudinal and cross motions. According to the invention, all cutters are set so that their points are situated in the same plane, which is perpendicular to the axis of the workpiece being machined, the non-forming cutters being arranged in positions wherein the depth of cut of each non-forming cutter is less than that of the forming cutter by a value equal to the height of surface micro-roughnesses produced by the forming cutter.

5 Claims, 3 Drawing Figures

METHOD OF MACHINING PARTS SHAPED AS BODIES OF REVOLUTION

BACKGROUND OF THE INVENTION

1. Field of the Invention

The present invention relates to machining of parts, and more particularly to methods for machining parts shaped as bodies of revolution through multi-cutter turning.

This invention can be used in turning of non-rigid shafts having a complex longitudinal profile and requiring both high accuracy and surface quality.

The invention is also applicable to machining of shafts on program-controlled lathes in small-lot production of machine parts.

2. Description of the Prior Art

In turning of machine parts such as non-rigid (flexible) shafts in which the length-to-diameter ratio is greater than 5, the cutting forces give rise to an elastic flexure (deformation) in the cross section of the shaft being machined, which results in a less accurate longitudinal shape of the shaft.

The flexure of the shaft being machined can be minimized by resorting to multi-cutter turning in which machining is effected simultaneously by several cutters uniformly spaced along the circumference, the axis of which is in line with that of the shaft. This decreases the resultant of the cutting forces acting in the cross section and causing the elastic flexure of the shaft during machining.

There are known methods of multi-cutter turning with longitudinal stock removal distribution, wherein all cutters are forming cutters and all have the cutting points thereof set in a same plane perpendicular to the axis of a workpiece at a distance therefrom equal to the radius of a finished part. As meant here longitudinal stock removal distribution is that in terms of chip thickness.

In these multi-cutter turning methods, the height of micro-roughnesses characterizing the roughness (quality) of the surface of a part being machined is governed by the accuracy of radial and longitudinal positions of each cutter.

The error in the radial positioning of cutters must not exceed the specified height of micro-roughnesses of the surface, whereas the tolerance on the longitudinal positioning of cutting points is determined from the admissible height of micro-roughnesses, account taken on the entering angle of all the forming cutters.

However, even a highly accurate positioning of all the cutting points in the above directions is not a sufficient precondition for attaining specified surface roughness and machining accuracy.

In particular, the unequal angles of sharpening and the different blunting of the cutters, even with accurately positioned cutting points, give rise to un-balanced cutting forces in the cross section of the workpiece, which cause an elastic flexure of the workpiece between its supports on the lathe.

In addition, in turning by several forming cutters uniformly spaced along a circumference, the axis of which fails to coincide with, because of the runout of the locating surfaces of a workpiece, that of the workpiece by the magnitude of the eccentricity thereof, the depth of cut of each cutter varies during one revolution of the workpiece by the double magnitude of the eccentricity of the workpiece. This results in a transversal spring-back of the workpiece, with the effect that one or two cutters lose in succession their forming capability during one revolution of the workpiece, and the machined surface is lobbed crosswise.

Therefore, multi-cutter turning with longitudinal stock removal distribution produces no quality surface finish, whereas the accuracy of machining depends on the runout of the workpiece.

Also known are methods of multi-cutter turning with a stock removal depth distribution, wherein the cutting point of one of the cutters, which is a forming cutter, is set at a distance from the axis of a workpiece equal to the radius of a finished part.

The cutting points of the other—the non-forming—cutters are arranged at distances from the axis of the workpiece within the stock being removed, but different from the radius of the finished part, in a manner that the stock left for machining is distributed equally between the non-forming cutters.

With respect to longitudinal feed, the cutters are successively offset by a length which exceeds the longitudinal feed of the forming cutter per revolution of the workpiece divided by the number of the cutters and depends on the depth of cut and the entering angle of the cutters.

That in the above method the cutting point of only a single cutter is set at a distance equal to the radius of a finished part provides a quality surface finish. However, as the cutting points of the non-forming cutters are offset with respect to longitudinal feed through a distance, which, account taken of the entering angle of the cutters of 45° or less, may exceed the depth of cut of the cutters, no machining of stepped and complex-shaped profiles is possible.

Also, in multi-cutter turning with stock removal distributed among cutters, that cutter which removes stock to a depth described by the contour of a finished part, presses against the part with a force whose magnitude varies as a function of the shape and the hardness of the part in the direction of longitudinal feed.

A variable force on one of the cutters disturbs the previous transversal equilibrium of forces and decreases the accuracy of machining through flexure of the part.

And so, methods involving stock removal depth distribution among cutters provide a quality finish, but fail to ensure adequate machining accuracy which depends heavily on the variations of the profile and of the hardness of a workpiece in the longitudinal section (in the direction of the longitudinal feed).

Forces acting upon a workpiece from cutters can be balanced, depending on the way stock removal is distributed among the cutters, by either of two cutter motion techniques: longitudinal stock removal is distributed by a longitudinal adjustment of all the cutters, whereas stock removal depth is distributed by adjusting the radial positions of the non-forming cutters.

For equal un-balanced forces, the longitudinal feed adjustments are much smaller, than the radial adjustments, so that the former can be completed with greater effectiveness and in a shorter period of time.

In known multi-cutter turning methods, the cutting forces or their components acting from the cutters on a workpiece are determined by measuring the forces or their components as reactions of cutter holders in tool carriers.

The above procedures for measuring the forces in multi-cutter turning of non-rigid parts are inaccurate, as what is measured is the forces acting upon the cutters, with the workpiece deformed elastically by the transversally unbalanced cutting forces.

Also, the measurement of the forces acting upon the cutters in the machining zone is affected by such variable factors as cutting temperature, cutter cooling temperature and others.

The measurement and the subsequent comparison of the forces in the cutter holders is also affected throughout the range of the measured cutting forces by the accuracy of load cells, amplifiers and control devices, this additionally impairing the accuracy of force balancing in multi-cutter turning.

The above methods require continuous control of the cutting forces using their measured values. The continuous measurement of the cutting forces during machining is also made difficult by entangled continuous chip and is ineffective in application to the turning of intermittent surfaces of parts.

SUMMARY OF THE INVENTION

It is therefore an object of the invention to provide a method for machining parts shaped as bodies of revolution through multi-cutter turning, which would ensure a quality surface finish.

Another object of the invention is to provide a method for machining parts by multi-cutter turning, which will ensure a high accuracy of machining.

Yet another object of the invention is to provide a method for machining parts shaped as bodies of revolution by a multi-cutter turning, which is highly productive.

The above and other objects are attained in a method for machining parts shaped as bodies of revolution by a multi-cutter turning, comprising mounting cutters uniformly along a circumference the axis of which coincides with that of a workpiece being machined in a manner to situate the points of the cutters in a single plane, perpendicular to the axis of the workpiece being machined; mounting one of the cutters—which is a forming one—so that the point thereof is at a distance from the axis of the workpiece being machined equal to the radius thereof and is set longitudinally in a position determined by the specified shape of the workpiece being machined; positioning the other cutters—non-forming ones—so that their points are situated at a distance from the axis of the workpiece being machined within the stock removal range, but different from the radius of the part to be machined, and in a manner that the depth of cut of each of the non-forming cutters is less than that of the forming cutter by a magnitude equal to the height of micro-roughnesses of the surface produced by the above forming cutter; feeding longitudinally all the above cutters; imparting radial displacements to all the above cutters.

As all the cutters are placed in a single plane, perpendicular to the axis of the workpiece being machined, it is possible to distribute the stock removal in terms of the depth of cut within the total depth of removed stock.

If the cutters are uniformly spaced along a circumference, the axis of which coincides with that of the workpiece being machined, all the cutters have, within the total depth of removed stock, a same thickness of chips, and where the depths of cut of the cutters differ little, the difference in the cross sections of the chips removed by each cutter is also as small. Therefore, this ensures a high accuracy of machining because the cutting forces in the cross section of the workpiece being machined disappear.

As the depth of cut of each cutter is less than that of the forming cutter by a magnitude equal to the height of the micro-roughnesses produced by the forming cutter, the height of the micro-roughnesses is a function of the specified surface quality and is in magnitude substantially smaller than the depths of cut of the cutters, thus providing another precondition for greater machining accuracy.

As the depth of cut of each non-forming cutter is smaller than that of the forming cutter, the finish surface machined by the forming cutter is of a high quality.

The compensation of transversal cutting forces in machining of parts shaped as bodies of revolution by multi-cutter turning cuts out elastic deformation on the supports thereof in the lathe, this particularly concerning flexible shafts. A decrease or a total elimination of elastic deformation of a workpiece being machined enhances productivity. It should also be noted that the above-mentioned mutual arrangement of the cutters in a single plane, perpendicular to the axis of the workpiece being machined, wherein cutting points of the cutters being set at radial distances which differ sue from another by a small value equal to the height of the micro-roughnesses of a surface being machined, makes possible the use of a method, according to the invention, for turning parts of complex shapes by cutters, the entering angles of which may vary over a large range.

It is essential to impart the non-forming cutters additional longitudinal feed as a function of the magnitude and the direction of the resultant of the transversally unbalanced cutting forces of all the cutters.

This re-distributes the thickness of the chip among the cutters and cancels out more effectively the cutting forces, account taken of the compensation of errors in radial and longitudinal feed positioning and of actual angles of cutter sharpening and blunting, all this improving accuracy.

The magnitude and the direction of the resultant of the transversally unbalanced cutting forces of the cutters can best be found from those of the reactions the workpiece supports offer to these cutting forces.

As the reaction of the supports to the cutting forces represents the overall action of a tool upon a workpiece, leading to a loss of accuracy in the machining of a part because of the elastic deformation thereof, account taken of attendant factors, including the accuracy of mounting and of sharpening of the cutters and of the blunting thereof, the greatest machining accuracy is achievable where the resultant of the transversally unbalanced cutting forces is determined from the magnitude and the direction the reactions the supports offer to those cutting forces.

It is advantageous to determine the magnitude and the direction of the additional motions of each of the non-forming cutters in the direction of the longitudinal feed from the projection of the resultant of the unbalanced transversal cutting forces of all the cutters upon the direction of the cutting forces of each of the non-forming cutters.

This provides a greatest machining accuracy, as it makes possible to allow for the individual influences of the magnitude and the direction of the transversal cutting force from each of the cutters upon the magnitude and the direction of their resultant in the cross section.

It is best to start measurements by determining the reaction of the support nearest the end where machining is started.

As the reaction of the support to the cutting forces in the cross section is at its maximum when the cutters are longitudinally in the cross section nearest the support where machining is begun, the highest machining accuracy will be obtained if the signal for controlling the longitudinal feed position of the cutter is determined from the value of precisely the reaction of the support near which machining is started.

Inasmuch as all the adjustments of the cutters are effected prior to actual machining, the multi-cutter turning of a part is carried out by considering only the longitudinal configuration of the part and imparting synchronous radial motions to all the cutters, so obviating the adverse effect of entangled chips upon the measurement of the reaction of the support, and, therefore, upon the adjustments of the cutters, all this enhancing machining accuracy and making it possible to turn intermittent surfaces of a part.

BRIEF DESCRIPTION OF THE DRAWINGS

These and other objects and features of the invention become readily apparent from one embodiment thereof which will now be described by way of example with reference to the accompanying drawings, in which.

DESCRIPTION OF THE PREFERRED EMBODIMENT

Figure 1:
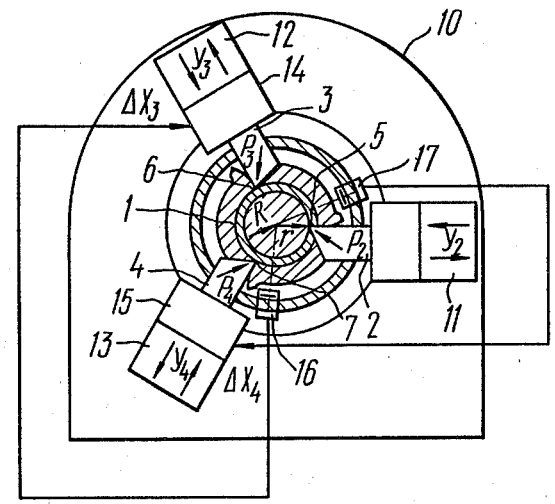
FIG. 1 is a cross section of the arrangement of cutters in a plane perpendicular to the axis of a workpiece being machined, according to the invention.

Described below is a method for machining parts shaped as bodies of revolution by multi-cutter turning, according to the invention. A workpiece 1 being machined (FIG. 1) is a shaft which is turned on a lathe and is being machined by three cutters 2, 3 and 4, the cutter 2 being a forming cutter, and the other ones 3 and 4, non-forming ones.

The number of the cutters may be increased or decreased, but there will always be a single forming cutter 2.

Figure 2:
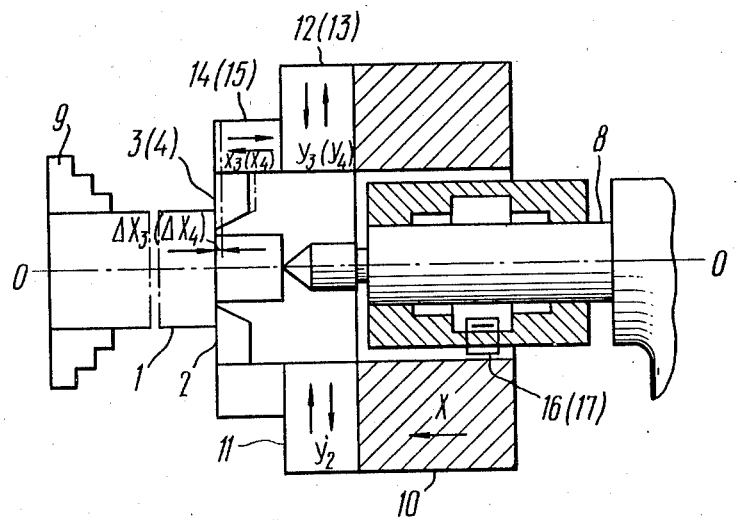
FIG. 2 represents the alignment of the points of the cutters in a single plane passing through the axis of a workpiece being machined, account taken of the magnitudes of the longitudinal feed and of the angular displacement (offsetting) of non-forming cutters relative to a forming cutter.

A method according to the invention is put into effect by arranging the cutters 2, 3 and 4 equidistantly along a circumference, the axis of which coincides with the axis O—O (FIG. 2) of the workpiece 1 being machined. The forming cutter 2 is set so that a point 5 thereof (FIG. 1) is spaced from the axis O—O of the workpiece 1 being machined of a distance equal to the radius of a finished part.

Figure 3:
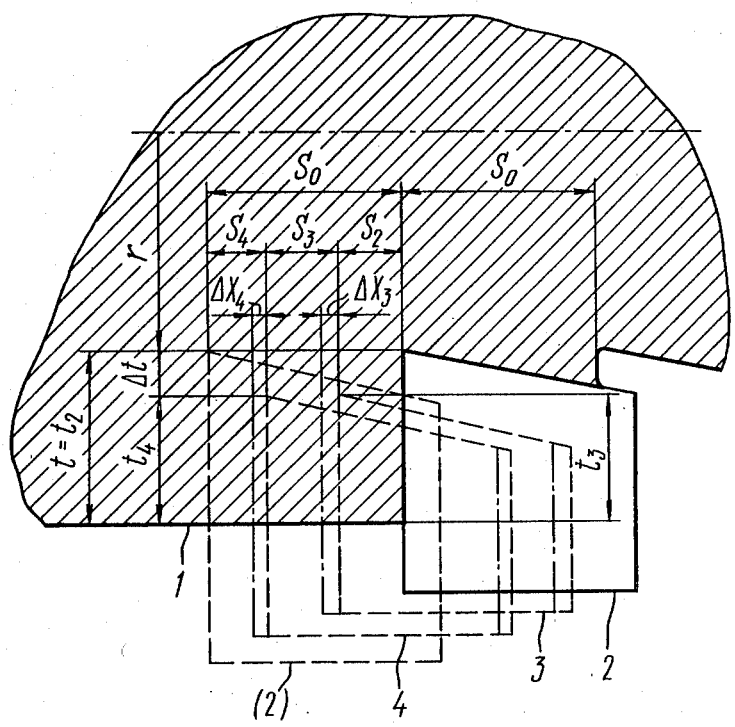
FIG. 3 illustrates schematically the distribution of stock removal among cutters, according to the invention.

The non-forming cutters 3 and 4 are positioned so that the points thereof respectively 6 and 7 are spaced from the axis O—O of the workpiece 1 being machined within a stock to be removed (FIG. 3), but a distance not equal to the radius r of a finished part 1. All the cutters 2, 3 and 4 are given interrelated radial motions $y_2$ (FIG. 1), $y_3$ and $y_4$ for removing stock t which is distributed among cutters 2, 3 and 4 in terms of depth of cut.

All the cutters 2, 3 and 4 are also given a longitudinal feed $S_0$ (FIG. 3) for turning the part 1 throughout the length thereof, each of the cutters 2, 3 and 4 being fed longitudinally through $S_2$, $S_3$ and $S_4$.

According to the invention, all the cutters 2, 3 and 4 are positioned so that the points 5, 6 and 7 thereof are in a single plane perpendicular to the axis O—O of the workpiece 1 being machined. The forming cutter 2 is then set so that the point 5 thereof occupies a position determined by the specific shape of the part in the longitudinal section, which corresponds to the radius r of the workpiece 1 being machined.

The non-forming cutters 3 and 4 are mounted so that their depths of cut respectively $t_3$ and $t_4$ are less than the depth of cut $t_2$ (equal to the machining allowance t) of the forming cutter 2 by a value $\Delta t$, equal to the height of surface micro-roughnesses produced by the forming cutter 2. This signifies that as the workpiece 1 is being turned, the points 6 and 7 of the cutters 3 and 4 are clear of the surface of the finished part 1 and thus do not mar the surface formed by the point 5 of the forming cutter 2. During machining, the errors in positioning of the non-forming cutters 3 and 4, differences in sharpening and blunting of all the cutters 2, 3 and 4 give rise to cutting forces $P_2$ (FIG. 1), $P_3$ and $P_4$ which are unbalanced in the cross section of the workpiece 1. A resultant R of the cutting forces $P_2$, $P_3$ and $P_4$ that are unbalanced in the cross section of the workpiece 1 acts upon the workpiece 1 being machined and upon supports 8 (FIG. 2) and 9 holding the workpiece 1 in the lathe. This leads to a loss in accuracy of machining because of elastic deformations and to reactions in the supports of the workpiece 1 in the lathe, produced by the cutting forces $P_2$, $P_3$ and $P_4$.

To minimize the cutting forces $P_2$, $P_3$ and $P_4$ that are unbalanced in the cross section of the workpiece 1, the cutters 2, 3 and 4 are given additional motions $\Delta X_2$, $\Delta X_3$ and $\Delta X_4$ (FIG. 3) in the direction of the longitudinal feed, the magnitude of which depends on the magnitude and the direction of the resultant R of the transversally unbalanced cutting forces $P_2$, $P_3$ and $P_4$ of all the cutters 2, 3 and 4.

The magnitude and the direction of the resultant R of the transversally unbalanced cutting forces $P_2$, $P_3$ and $P_4$ are then determined from the magnitude and the direction of the reactions the supports 8 and 9 offer to these cutting forces. To this end, the magnitude and direction of the additional longitudinal motions $\Delta X_3$ and $\Delta X_4$ of each of the non-forming cutters 3, 4 are determined from the projection of the resultant R of the transversally unbalanced cutting forces $P_2$, $P_3$ and $P_4$ of all the cutters 2, 3 and 4 upon the direction of the cutting forces of each of the non-forming cutters 3 and 4.

As turning produces a chip which obstructs the determination of the reactions of the supports 8 and 9 in the course of machining and as the reactions of the supports 8 and 9 depend on the positions of the cutters 2, 3 and 4, the reaction is determined of that support which is nearest an end of the workpiece 1 which on machining is started.

A method for machining the part 1 shaped as a body of revolution, for example, a shaft, through turning by three cutters 2, 3 and 4 is put into effect in the manner below.

A lathe having supports 8 and 9 for mounting a workpiece 1 and a longitudinal slide 10 carries radial slides 11, 12 and 13 (FIG. 1), uniformly spaced along a circumference, the axis of which coincides with the axis O—O of the part 1. A forming cutter 2 is secured on the radial slide 11, whereas the radial slides 12 and 13 receive micro-motion devices respectively 14 and 15 on which are secured the cutters respectively 3 and 4. The micro-motion devices 14 and 15 are capable of effecting independent adjustment motions $X_3$ (FIG. 2) and $X_4$ of the cutters 3 and 4 in the direction of the longitudinal feed ($S_0$).

To determine the reactions the cutting forces $P_2$, $P_3$ and $P_4$ produce on the support 8 of the workpiece 1 and the direction of the cutting forces $P_3$ and $P_4$ of the cutters, the deformation of the support 8 is measured using load cells 16 (FIG. 1) and 17. Before machining is started, the workpiece 1 (a shaft) is mounted on the supports 8 and 9 of the lathe, and the longitudinal slide 10 is moved in a position where the plane of the cutting points 5, 6, 7 of the cutters 2, 3, 4 is aligned with the face (end) of the workpiece 1 secured in the support 8. The cutter 2 is then moved longitudinally in a position where the cutting point thereof 5 is set for the radius r of the finished part 1, whereas the cutters 3 and 4 are moved radially so that the cutting points 6 and 7 are set to a size equal to $r+\Delta t$, which exceeds the radius r of the finished part 1 by the height $\Delta t$ of the micro-roughnesses on the surface of the workpiece 1 (shaft) being machined.

During turning, the longitudinal slide 10 is moved at a feed $S_0$ from the support 8 toward the support 9.

In the process, the forming cutter removes stock through a depth $t_2$, whereas the cutters 3 and 4 remove stock through a depth $t_3=t_4=t_2-\Delta t$.

The longitudinal feed $S_0$ at the depth of cut on the range from O to $t_3=t_4=t_2-\Delta t$ will distribute itself into magnitudes respectively $S_2$, $S_3$ and $S_4$, the values of which determine the thickness of the chip of the cutters 2, 3 and 4, whereas the longitudinal feed of the cutter 2 at the depth of cut from $t_2$ to $t_3=t_4$ equals $S_0$. The turning by each cutter 2, 3 and 4 gives rise in the cross section of the workpiece 1 to the cutting forces $P_2$, $P_3$ and $P_4$ which produce the resultant R applied to the workpiece 1 and acting there through upon the support 8, causing a deformation thereof in the direction of action of the force R.

The reaction of the support 8 in the directions of the cutting forces $P_3$ and $P_4$ are determined using load cells 16 and 17. The magnitude of the reaction of the support 8 is determined by the load cells 16 and 17 as the projection of the resultant R upon the directions of the cutting forces $P_3$ and $P_4$, the angular position of which coincides with that of the load cells 16 and 17 relative to the axis of the workpiece 1.

Signals quantifying the deformation of the support 8 in the directions of the cutting forces $P_3$ and $P_4$ are entered in the micro-motion devices respectively 14 and 15 which move the cutters 3 and 4 in the direction of the longitudinal feed $S_0$ by a magnitude $\Delta X_3$ (FIG. 1) and $\Delta X_4$. This changes the thickness of the chip removed by the cutters 2, 3 and 4 and so re-distributes the cutting forces $P_2$, $P_3$ and $P_4$. This process continues until the cutting forces $P_2$, $P_3$ and $P_4$ cancel out, with the resultant R then equalling 0 (zero).

This completes the adjustment of the cutters 3 and 4 in the direction of the longitudinal feed.

The further machining of the workpiece 1 to obtain the part 1 of specified configuration is effected through the longitudinal motion only of the slide 10 in the direction X (FIG. 2), with synchronous interrelated motion of the cutters 2, 3 and 4 in the radial directions $y_1$, $y_2$ and $y_3$.

What is claimed is:

1. A method of machining parts shaped as bodies of revolution by multi-cutter turning, wherein one cutter is a forming one, and the others, non-forming ones, comprising the following operations: arranging said cutters uniformly angularly spaced along a circumference, the axis of which coincides with that of a workpiece being machined, so that the points of said cutters are located in a single, common plane perpendicular to the axis of the workpiece being machined; setting said forming cutter so that the point thereof is spaced radially apart from the axis of the workpiece being machined at a distance equal to the radius of a finished part of the workpiece in a position determined by the specified shape of the finished part of the workpiece in longitudinal section thereof; arranging said non-forming cutters so that the points thereof are spaced radially apart from the axis of the workpiece being machined at distances within the thickness of stock to be removed, but different from the radius of the finished part to be produced, and occupy positions wherein the depth of cut by each said non-forming cutter is less than the depth of cut of said forming cutter by a magnitude equal to the height of surface micro-roughnesses produced by said forming cutter; imparting to all said cutters interrelated radial and longitudinal feed motions.

2. A method as claimed in claim 1, detecting unbalanced transverse cutting forces of the cutters and developing a transverse detected resultant, and wherein said nonforming cutters are imparted additional motions in the direction of the longitudinal feed as a function of the magnitude and the direction of a detected resultant of transversally unbalanced cutting forces of all the cutters.

3. A method as claimed in claim 2, wherein the magnitude and the direction of said detected resultant of the transversally-unbalanced cutting forces of all said cutters are determined by detecting the magnitude and the direction of reactions forces of supports holding the workpiece being machined offer to these cutting forces.

4. A method as claimed in claim 2, wherein the magnitude and the direction of said adjusting motions of each of said non-forming cutters in the direction of said longitudinal feed are determined from the projection of said resultant of said transversely unbalanced forces of all said cutters upon the direction of the cutting forces of each of said non-forming cutters.

5. A method as claimed in claim 3, wherein said reaction forces are determined at the workpiece support that is nearest the end of the workpiece on which machining is begun.

* * * * *